United States Patent
Erivantcev et al.

(10) Patent No.: US 10,705,113 B2
(45) Date of Patent: Jul. 7, 2020

(54) CALIBRATION OF INERTIAL MEASUREMENT UNITS ATTACHED TO ARMS OF A USER TO GENERATE INPUTS FOR COMPUTER SYSTEMS

(71) Applicant: Finch Technologies Ltd., Road Town, Tortola (VG)

(72) Inventors: Viktor Vladimirovich Erivantcev, Ufa (RU); Rustam Rafikovich Kulchurin, Ufa (RU); Ravil Salavatovich Shafikov, Kumertau (RU); Alexander Sergeevich Lobanov, Ufa (RU); Iakov Evgenevich Sergeev, Ufa (RU); Alexey Ivanovich Kartashov, Moscow (RU)

(73) Assignee: Finch Technologies Ltd., Fish Bay, Tortola (VG)

( * ) Notice: Subject to any disclaimer, the term of this patent is extended or adjusted under 35 U.S.C. 154(b) by 385 days.

(21) Appl. No.: 15/817,646

(22) Filed: Nov. 20, 2017

(65) Prior Publication Data
US 2018/0313867 A1 Nov. 1, 2018

Related U.S. Application Data

(60) Provisional application No. 62/491,909, filed on Apr. 28, 2017.

(51) Int. Cl.
*G01P 21/00* (2006.01)
*G01P 15/18* (2013.01)
(Continued)

(52) U.S. Cl.
CPC .............. *G01P 21/00* (2013.01); *G01P 15/18* (2013.01); *G06F 3/011* (2013.01); *G01P 15/08* (2013.01); *G01P 15/14* (2013.01)

(58) Field of Classification Search
CPC .......... G01P 21/00; G01P 15/18; G01P 15/08; G01P 15/14; G06F 3/011
See application file for complete search history.

(56) References Cited

U.S. PATENT DOCUMENTS 8,187,100 B1  5/2012 Kahn et al.
8,933,886 B2  1/2015 Imoto et al.
(Continued)

FOREIGN PATENT DOCUMENTS

CN    103226398    7/2013
WO    2016183812   11/2016
WO    2016209819   12/2016

OTHER PUBLICATIONS

Camera Calibration and 3D Reconstruction, OpenCV 2.4.13.6 documentation, https://docs.opencv.org/2.4/modules/calib3d/doc/camera_calibration_and_3d_reconstruction.html, printed on Jun. 11, 2018.
(Continued)

*Primary Examiner* — Regis J Betsch
(74) *Attorney, Agent, or Firm* — Greenberg Traurig (57) ABSTRACT

A system including: a sensor module having an inertial measurement unit and attached to an arm of a user. The sensor module is initially calibrated to measure its orientation relative an initial reference pose. To recalibrate the sensor module, the arm of the user is moved to obtain a measurement of an orientation of the arm at a calibration pose relative to the reference pose. The arm is in a horizontal plan in both the calibration pose and the reference pose. Preferably, both arms are straight in the horizontal plane; and the hands meet each other at the calibration pose. The arm module may have twisted around the arm of the user from the time of the initial calibration and the time of recalibration. A twist of the arm module around the arm of (Continued)

the user is computed from the orientation measurement at the reference pose for recalibration.

20 Claims, 4 Drawing Sheets

(51) Int. Cl.
*G06F 3/01* (2006.01)
*G01P 15/08* (2006.01)
*G01P 15/14* (2013.01)

(56) References Cited

U.S. PATENT DOCUMENTS

| | | | |
|---|---|---|---|
| 8,988,438 B2 | 3/2015 | Bang et al. | |
| 9,141,194 B1 | 9/2015 | Keyes et al. | |
| 9,278,453 B2 | 3/2016 | Assad | |
| 9,405,372 B2 | 8/2016 | Yen et al. | |
| D772,986 S | 11/2016 | Chen et al. | |
| 9,504,414 B2 | 11/2016 | Coza et al. | |
| 9,600,925 B2 | 3/2017 | Katz et al. | |
| 9,891,718 B2 | 2/2018 | Connor | |
| 9,996,945 B1 | 6/2018 | Holzer et al. | |
| 10,019,806 B2 | 7/2018 | Perry et al. | |
| 10,379,613 B2 | 8/2019 | Erivantcev et al. | |
| 10,509,464 B2 | 12/2019 | Erivantcev et al. | |
| 10,509,469 B2 | 12/2019 | Erivantcev et al. | |
| 10,521,011 B2 | 12/2019 | Erivantcev et al. | |
| 10,534,431 B2 | 1/2020 | Erivantcev et al. | |
| 10,540,006 B2 | 1/2020 | Erivantcev et al. | |
| 2003/0142065 A1 | 7/2003 | Pahlavan | |
| 2007/0050597 A1 | 3/2007 | Ikeda | |
| 2007/0273610 A1 | 11/2007 | Baillot | |
| 2008/0088468 A1 | 4/2008 | Kim | |
| 2008/0262772 A1* | 10/2008 | Luinge | A61B 5/1114 702/94 |
| 2009/0322763 A1 | 12/2009 | Bang et al. | |
| 2010/0079466 A1 | 4/2010 | Griffin | |
| 2011/0025853 A1 | 2/2011 | Richardson | |
| 2011/0161804 A1 | 6/2011 | Park et al. | |
| 2012/0025945 A1 | 2/2012 | Yazadi et al. | |
| 2012/0130203 A1 | 5/2012 | Stergiou et al. | |
| 2012/0214591 A1 | 8/2012 | Ito et al. | |
| 2012/0293410 A1 | 11/2012 | Bell | |
| 2014/0028547 A1 | 1/2014 | Bromley et al. | |
| 2014/0201689 A1 | 7/2014 | Bedikian et al. | |
| 2014/0313022 A1 | 10/2014 | Moeller et al. | |
| 2015/0062086 A1 | 3/2015 | Nattukallingal | |
| 2015/0077347 A1 | 3/2015 | OGreen | |
| 2015/0145860 A1 | 5/2015 | Craig et al. | |
| 2015/0145985 A1 | 5/2015 | Gourlay et al. | |
| 2015/0154453 A1 | 6/2015 | Wilf | |
| 2015/0213653 A1* | 7/2015 | Kord | G06F 3/011 345/420 |
| 2015/0277559 A1 | 10/2015 | Vescovi et al. | |
| 2015/0358543 A1 | 12/2015 | Kord | |
| 2016/0005232 A1 | 1/2016 | Quarles | |
| 2016/0054797 A1 | 2/2016 | Tokubo et al. | |
| 2016/0077608 A1 | 3/2016 | Nakasu et al. | |
| 2016/0187969 A1 | 6/2016 | Larsen et al. | |
| 2016/0306431 A1 | 10/2016 | Stafford et al. | |
| 2016/0313798 A1 | 10/2016 | Connor | |
| 2016/0378204 A1 | 12/2016 | Chen et al. | |
| 2017/0053454 A1 | 2/2017 | Katz et al. | |
| 2017/0083084 A1 | 3/2017 | Tatsuta et al. | |
| 2017/0115728 A1 | 4/2017 | Park et al. | |
| 2017/0147066 A1 | 5/2017 | Katz et al. | |
| 2017/0186226 A1 | 6/2017 | Cashman et al. | |
| 2017/0308165 A1 | 10/2017 | Erivantcev et al. | |
| 2017/0347885 A1* | 12/2017 | Tan | A61B 5/0022 |
| 2017/0352188 A1 | 12/2017 | Levitt | |
| 2018/0095637 A1 | 4/2018 | Valdivia et al. | |
| 2018/0101989 A1 | 4/2018 | Frueh et al. | |
| 2018/0122098 A1 | 5/2018 | Wang et al. | |
| 2018/0165879 A1 | 6/2018 | Holzer et al. | |
| 2018/0217680 A1 | 8/2018 | Sudou et al. | |
| 2018/0225517 A1 | 8/2018 | Holzer et al. | |
| 2018/0253142 A1 | 9/2018 | Tsuchie et al. | |
| 2018/0330521 A1 | 11/2018 | Samples et al. | |
| 2018/0335834 A1 | 11/2018 | Erivantcev et al. | |
| 2018/0335843 A1 | 11/2018 | Erivantcev et al. | |
| 2018/0335855 A1 | 11/2018 | Erivantcev et al. | |
| 2019/0187784 A1 | 6/2019 | Erivantcev et al. | |
| 2019/0212359 A1 | 7/2019 | Erivantcev et al. | |
| 2019/0212807 A1 | 7/2019 | Erivantcev et al. | |
| 2019/0332171 A1 | 10/2019 | Erivantcev et al. | |
| 2020/0033937 A1 | 1/2020 | Erivantcev et al. | |

OTHER PUBLICATIONS

Forward kinematics, Wikipedia, printed on Sep. 21, 2017.
Stereo camera, Wikipedia, printed on Jun. 29, 2018.
Accessories for Vive, retrieved from https://www.vive.com/us/accessory/ on Jan. 30, 2017.
Daydream, retrieved from https://vr.google.com/daydream/ on Jan. 30, 2017.
Forward kinematics, Wikipedia, retrieved from https://en.wikipedia.org/wiki/Forward_kinematics on Sep. 21, 2017.
Gest—Work with your hands. Wayback Machine 2016. Retrieved from https://web.archive.org/web/20160304012247/https://gest.co/ on Jan. 30, 2017.
Gloveone: Feel Virtual Reality. Wayback Machine 2016. Retrieved from https://web.archive.org/web/20160307080001/https://www.gloveonevr.com/ on Jan. 30, 2017.
International Application No. PCT/US2017/028982, International Search Report and Written Opinion, dated Aug. 24, 2017.
Manus VR—The Pinnacle of Virtual Reality Controllers, Manus VR Development Kit Pro Q4 2016.
Manus VR—The virtual reality dataglove for consumers. Wayback Machine 2016. Retrieved from https://web.archive.org/web/20160417035626/https://manusvr.com/ on Jan. 30, 2017.
NeuroDigital: The VR Technology Factory, retrieved from https://www.neurodigital.es/ on Jan. 30, 2017.
Oculus Rift | Oculus. Retrieved from https://www3.oculus.com/enus/rift/ on Jan. 30, 2017.
RevolVR Virtual Reality Controllers, retrieved from http://revolvr.co/ on Jan. 30, 2017.
Wireless Gaming Controllers for PC, Mac, and Mobile | SteelSeries, retrieved from https://steelseries.com/gamingcontrollers on Jan. 30, 2017.
Xbox Wireless Controller, retrieved from http://www.xbox.com/en-US/xbox-one/accessories/controllersixbox-wireless-controller on Jan. 30, 2017.

* cited by examiner

Receive an measurement of the orientation of a sensor module attached to an arm of a user in a calibration pose relative to a reference pose 201

Calculate a first rotation of the sensor module around a lengthwise direction of the arm from the reference pose to the calibration pose 203

Calculate a second rotation of the sensor module around a vertical axis, from a projection of a lengthwise direction of the arm at the calibration pose in a horizontal plane, to an expected lengthwise direction of the arm in an updated reference pose 205

Calibrate subsequent orientation measurements of the sensor module using the first rotation and the second rotation 207

CALIBRATION OF INERTIAL MEASUREMENT UNITS ATTACHED TO ARMS OF A USER TO GENERATE INPUTS FOR COMPUTER SYSTEMS

RELATED APPLICATIONS

The present application claims the benefit of the filing date of Prov. U.S. Pat. App. Ser. No. 62/491,909, filed Apr. 28, 2017 and entitled "Calibration of 3-D Object Models based on Fixed IMU Sensors", the entire disclosure of which is hereby incorporated herein by reference.

The present application relates to U.S. patent application Ser. No. 15/813,813, filed Nov. 15, 2017 and entitled "Tracking Torso Orientation to Generate Inputs for Computer Systems", which claims the benefit of the filing date of Prov. U.S. Pat. App. Ser. No. 62/507,090, filed May 16, 2017. The present application also relates to U.S. patent application Ser. No. 15/792,255, filed Oct. 24, 2017 and entitled "Tracking Finger Movements to Generate Inputs for Computer Systems", and U.S. patent application Ser. No. 15/787,555, filed Oct. 18, 2017 and entitled "Tracking Arm Movements to Generate Inputs for Computer Systems", both claim the benefit of the filing date of Prov. U.S. Pat. App. Ser. No. 62/507,085, filed May 16, 2017. The present application also relates to U.S. patent application Ser. No. 15/492,915, filed Apr. 20, 2017 and entitled "Devices for Controlling Computers based on Motions and Positions of Hands", which claims the benefit of the filing dates of 62/325,925, filed Apr. 21, 2016 and entitled "Hand-Worn Devices for Controlling Computers based on Motions and Positions of Hands and Fingers", Prov. U.S. Pat. App. Ser. No. 62/463,183, filed Feb. 24, 2017 and entitled "Devices for Controlling Computers based on Motions and Positions of Hands and Arms," Prov. U.S. Pat. App. Ser. No. 62/463,209, filed Feb. 24, 2017 and entitled "Devices for Controlling Computers based on Motions and Positions of Hands," Prov. U.S. Pat. App. Ser. No. 62/463,252, filed Feb. 24, 2017 and entitled "Devices for Controlling Computers based on Motions and Positions of Hands and Arms." The entire disclosures of the above-referenced related applications are hereby incorporated herein by reference.

FIELD OF THE TECHNOLOGY

The embodiments disclosed herein relate to computer input devices in general and more particularly but not limited to input devices for virtual reality and/or augmented/mixed reality applications implemented using computing devices, such as mobile phones, smart watches, similar mobile devices, and/or other devices.

BACKGROUND

U.S. Pat. App. Pub. No. 2014/0028547 discloses a user control device having a combined inertial sensor to detect the movements of the device for pointing and selecting within a real or virtual three-dimensional space.

U.S. Pat. App. Pub. No. 2015/0277559 discloses a finger-ring-mounted touchscreen having a wireless transceiver that wirelessly transmits commands generated from events on the touchscreen.

U.S. Pat. App. Pub. No. 2015/0358543 discloses a motion capture device that has a plurality of inertial measurement units to measure the motion parameters of fingers and a palm of a user.

U.S. Pat. App. Pub. No. 2007/0050597 discloses a game controller having an acceleration sensor and a gyro sensor. U.S. Pat. No. D772,986 discloses the ornamental design for a wireless game controller.

Chinese Pat. App. Pub. No. 103226398 discloses data gloves that use micro-inertial sensor network technologies, where each micro-inertial sensor is an attitude and heading reference system, having a tri-axial micro-electromechanical system (MEMS) micro-gyroscope, a tri-axial micro-acceleration sensor and a tri-axial geomagnetic sensor which are packaged in a circuit board. U.S. Pat. App. Pub. No. 2014/0313022 and U.S. Pat. App. Pub. No. 2012/0025945 disclose other data gloves.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

At least some embodiments disclosed herein allow the determination of the deviation of the measurement space of a sensor device from a reference coordinate system using a convenient pose of a user wearing the sensor device on arms of the user.

Figure 1:
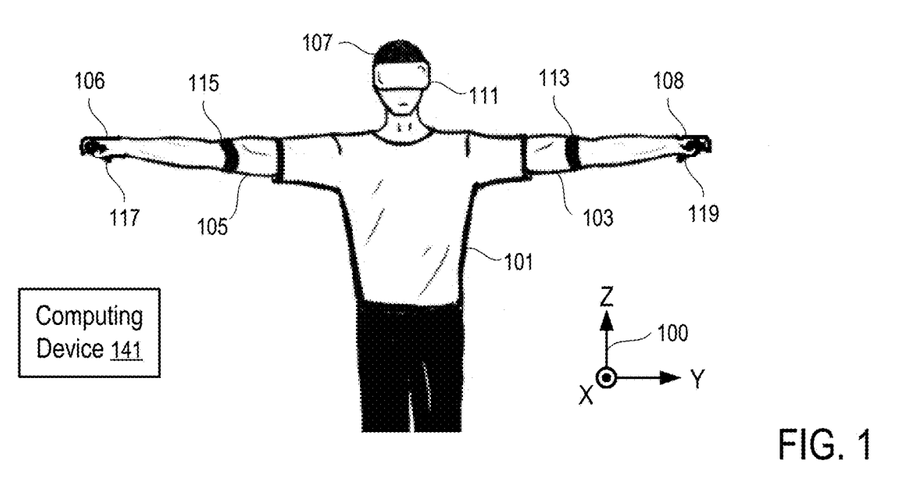
FIG. 1 illustrates a system to track movements of a user according to one embodiment.

FIG. 1 illustrates a system to track movements of a user according to one embodiment.

In FIG. 1, a user wears a number of sensor devices (111, 113, 115, 117 and 119). Each of the sensor devices (111-119) has an inertial measurement unit (IMU) to determine its orientation. Thus, the sensor devices (111-119) track the orientations of portions of user that are movable relative to the torso (101) of the user and relative to each other, such as the head (107), the upper arms (103 and 105), and the hands (106 and 108).

The sensor devices (111-119) communicate their movement/orientation measurements to a computing device (141), e.g., to control gesture input and/or an avatar of the user in a virtual reality, mixed reality, or augmented reality application in the computing device (141).

Typically, the measurements of the sensor devices (111-119) are calibrated for alignment with a common reference system, such as a coordinate system (100).

In FIG. 1, the coordinate system (100) is aligned with a number of directions relative to the user when the user is in the reference pose illustrated in FIG. 1. The direction Z is parallel to the vertical direction from the feet of the user to the head (107) of the user; the direction Y is parallel to the sideway direction from one hand (106) of the user to another hand (108) of the user; and the direction X is parallel to the front-back direction relative to the torso (101) of the user in the reference pose.

Figure 2:
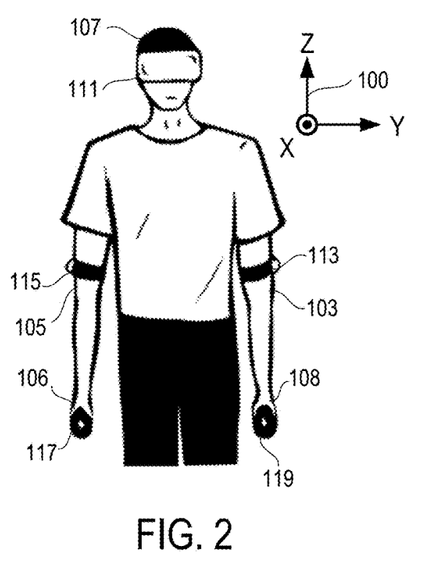
FIGS. 2 and 3 illustrate examples user poses that may be combined to calibrate inertial measurement units attached to the arms of a user.
Figure 3:
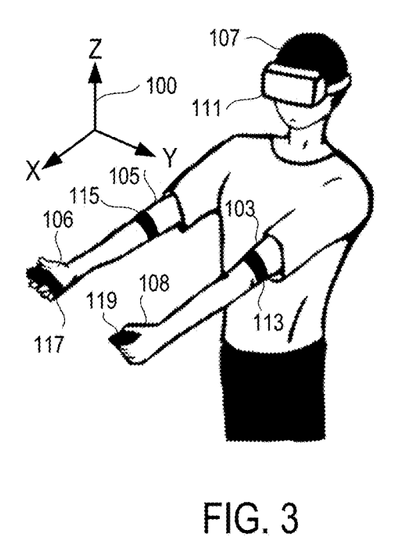

The directions X, Y and Z can be identified to the computing device (141) via combinations of reference poses, such as the poses illustrated in FIGS. 1-3.

When in the reference pose illustrated in FIG. 1, the arms (103 and 105) of the user extends horizontally in the sideways, in alignment with the direction Y of the coordinate system (100).

When in the reference pose illustrated in FIG. 2, the arms (103 and 105) of the user extends vertically in alignment with the direction Z of the coordinate system (100).

When in the reference pose illustrated in FIG. 3, the arms (103 and 105) of the user extends forwards and horizontally, in alignment with the direction X of the coordinate system (100).

From the pose of FIG. 1 to the pose of FIG. 2, the arms (103 and 105) of the user rotate along the direction X. Thus, by comparing the orientations of the sensor devices (113-119) that rotate with the arms (103 and 105) along the direction X from the pose of FIG. 1 to the pose of FIG. 2, the computing device (141) computes the direction X in the measurement spaces of the sensor devices (113-119).

From the pose of FIG. 2 to the pose of FIG. 3, the arms (103 and 105) of the user rotate along the direction Y. Thus, by comparing the orientations of the sensor devices (113-119) that rotate with the arms (103 and 105) along the direction Y from the pose of FIG. 2 to the pose of FIG. 3, the computing device (141) computes the direction Y in the measurement spaces of the sensor devices (113-119).

From the pose of FIG. 3 to the pose of FIG. 1, the arms (103 and 105) of the user rotate along the direction Z. Thus, by comparing the orientations of the sensor devices (113-119) that rotate with the arms (103 and 105) along the direction Z from the pose of FIG. 3 to the pose of FIG. 1, the computing device (141) computes the direction Z in the measurement spaces of the sensor devices (113-119).

Further, the direction Z can be computed as a direction orthogonal to the directions X and Y in a three dimensional space; the direction Y can be computed as a direction orthogonal to the directions X and Z in the three dimensional space; and the direction X can be computed as a direction orthogonal to the directions Y and Z in the three dimensional space.

Thus, from the measured orientations of the sensor devices (113-119) in the three reference poses illustrated in FIGS. 1-3, the computing device computes the relative orientation change between the reference coordinate system (100) and the measurement space of each of the sensor devices (113-119). Subsequently, the relative rotation can be used to calibration the corresponding one of the sensor devices (113-119) such that the calibrated orientation measurements relative to the common reference coordinate system (100).

The head sensor (111) can also be calibrated to produce measurements relative to the common reference coordinate system (100). For example, the average of the orientations of the head sensor (111) in the reference poses of FIGS. 1-3, or one of the orientations, can be considered as a reference orientation that is aligned with the common reference coordinate system (100); and the subsequent measurements of the head sensor (111) can be calibrated as being relative to the reference orientation.

After the measurements of the sensor devices (111-119) are calibrated to measure relative to the common reference coordinate system (100), the hands, arms (105, 103), the head (107) and the torso (101) of the user may move relative to each other and relative to the coordinate system (100). The measurements of the sensor devices (111-119) provide orientations of the hands (106 and 108), the upper arms (105, 103), and the head (107) of the user relative to the common coordinate system (100).

In some implementations, each of the sensor devices (111-119) communicates its measurements directly to the computing device (141) in a way independent from the operations of other sensor devices.

Alternative, one of the sensor devices (111-119) may function as a base unit that receives measurements from one or more other sensor devices and transmit the bundled and/or combined measurements to the computing device (141).

Preferably, wireless connections made via a personal area wireless network (e.g., Bluetooth connections), or a local area wireless network (e.g., Wi-Fi connections) are used to facilitate the communication from the sensor devices (111-119) to the computing device (141).

Alternatively, wired connections can be are used to facilitate the communication among some of the sensor devices (111-119) and/or with the computing device (141).

For example, a hand module (117 or 119) attached to or held in a corresponding hand (106 or 108) of the user may receive the motion measurements of a corresponding arm module (115 or 113) and transmit the motion measurements of the corresponding hand (106 or 108) and the corresponding upper arm (105 or 103) to the computing device (141).

For example, the hand modules (117 and 119) and the arm modules (115 and 113) can be each respectively implemented via a base unit (or a game controller) and an arm/shoulder module discussed in U.S. patent application Pub. Ser. No. 15/492,915, filed Apr. 20, 2017 and entitled "Devices for Controlling Computers based on Motions and Positions of Hands", the entire disclosure of which application is hereby incorporated herein by reference.

In some implementations, the head module (111) is configured as a base unit that receives the motion measurements from the hand modules (117 and 119) and the arm modules (115 and 113) and bundles the measurement data for transmission to the computing device (141). In some instances, the computing device (141) is implemented as part of the head module (111).

The head module (111) may further determine the orientation of the torso (101) from the orientation of the arm modules (115 and 113) and/or the orientation of the head module (111) and thus eliminates the need to attach a separate sensor device to the torso (101), as discussed in U.S. patent application Ser. No. 15/813,813, filed Nov. 15, 2017, the disclosure of which is hereby incorporated herein by reference.

For the determination of the orientation of the torso (101), the hand modules (117 and 119) are optional in the system illustrated in FIG. 1. Further, in some instances the head module (111) is not used, in the tracking of the orientation of the torso (101) of the user.

Optionally, the computing device (141), or a hand module (e.g., 117), may combine the measurements of the hand module (e.g., 117) and the measurements of the corresponding arm module (e.g., 115) to compute the orientation of the forearm connected between the hand (106) and the upper arm (105), in a way as disclosed in U.S. patent application Ser. No. 15/787,555, filed Oct. 18, 2017 and entitled "Tracking Arm Movements to Generate Inputs for Computer Systems", the entire disclosure of which is hereby incorporated herein by reference.

Figure 4:
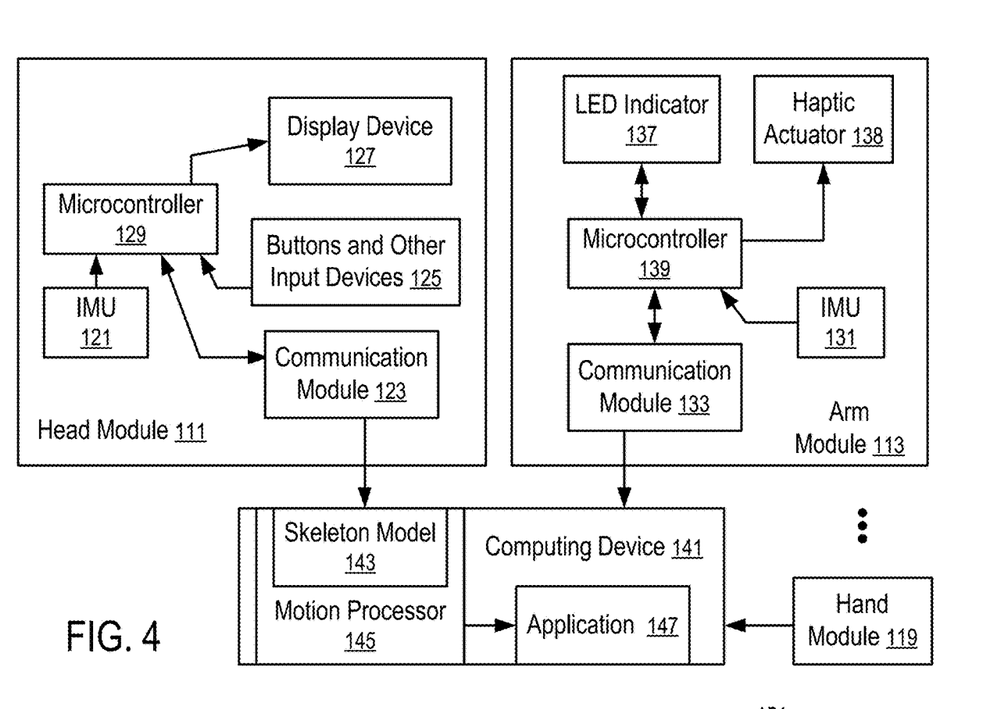
FIG. 4 illustrates a system to control computer operations according to one embodiment.

FIG. 4 illustrates a system to control computer operations according to one embodiment. For example, the system of FIG. 4 can be implemented via attaching the arm modules (115, 113) to the upper arms (105 and 103) respectively and optionally, the head module (111) to the head (107), in a way illustrated in FIGS. 1-3.

In FIG. 4, the head module (111) and the arm module (113) have micro-electromechanical system (MEMS) inertial measurement units (IMUs) (121 and 131) that measure motion parameters and determine orientations of the head (107) and the upper arm (103). Similarly, the hand module (119) may also have its IMU.

Each of the IMUs (131, 121) has a collection of sensor components that enable the determination of the movement, position and/or orientation of the respective IMU along a number of axes. Examples of the components are: a MEMS accelerometer that measures the projection of acceleration (the difference between the true acceleration of an object and the gravitational acceleration); a MEMS gyroscope that measures angular velocities; and a magnetometer that measures the magnitude and direction of a magnetic field at a certain point in space. In some embodiments, the IMUs use a combination of sensors in three and two axes (e.g., without a magnetometer).

Figure 6:
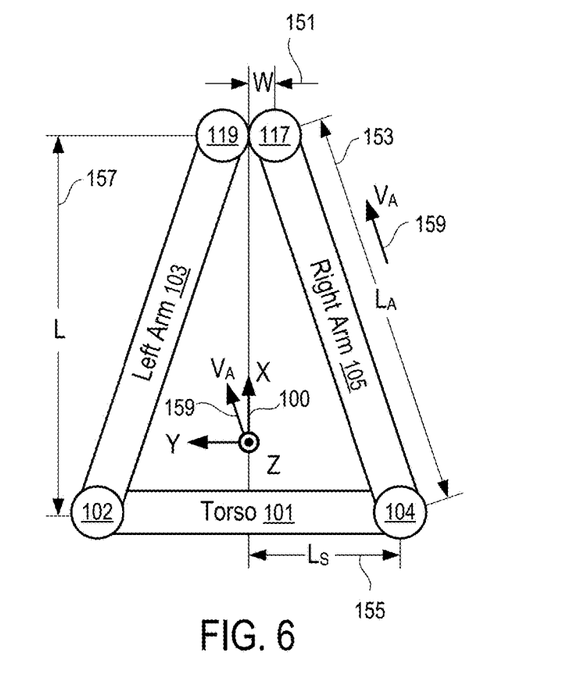
FIG. 6 illustrates a skeleton model for the calibration according to the user pose of FIG. 5.

The computing device (141) has a motion processor (145), which includes a skeleton model (143) of the user (e.g., illustrated FIG. 6). The motion processor (145) controls the movements of the corresponding parts of the skeleton model (143) according to the movements/orientations of the upper arms (103 and 105) measured by the arm modules (113 and 115), the movements/orientation of the head (107) measured by the head module (111), the movements/orientations of the hand (106 and 108) measured by the hand modules (117 and 119), etc.

The skeleton model (143) is controlled by the motion processor (145) to generate inputs for an application (147) running in the computing device (141). For example, the skeleton model (143) can be used to control the movement of an avatar/model of the arms (105 and 103), the hands (106 and 108), the head (107), and the torso (101) of the user of the computing device (141) in a video game, a virtual reality, a mixed reality, or augmented reality, etc.

Preferably, the arm module (113) has a microcontroller (139) to process the sensor signals from the IMU (131) of the arm module (113) and a communication module (133) to transmit the motion/orientation parameters of the arm module (113) to the computing device (141). Similarly, the head module (111) has a microcontroller (129) to process the sensor signals from the IMU (121) of the head module (111) and a communication module (123) to transmit the motion/orientation parameters of the head module (111) to the computing device (141).

Optionally, the arm module (113) and the head module (111) have LED indicators (137 and 127) respectively to indicate the operating status of the modules (113 and 111).

Optionally, the arm module (113) has a haptic actuator (138) respectively to provide haptic feedback to the user.

Optionally, the head module (111) has a display device (127) and/or buttons and other input devices (125), such as a touch sensor, a microphone, a camera, etc.

In some implementations, the head module (111) is replaced with a module that is similar to the arm module (113) and that is attached to the head (107) via a strap or is secured to a head mount display device.

In some applications, the hand module (119) can be implemented with a module that is similar to the arm module (113) and attached to the hand via holding or via a strap. Optionally, the hand module (119) has buttons and other input devices, such as a touch sensor, a joystick, etc.

For example, the handheld modules disclosed in U.S. patent application Ser. No. 15/792,255, filed Oct. 24, 2017 and entitled "Tracking Finger Movements to Generate Inputs for Computer Systems", U.S. patent application Ser. No. 15/787,555, filed Oct. 18, 2017 and entitled "Tracking Arm Movements to Generate Inputs for Computer Systems", and/or U.S. patent application Ser. No. 15/492,915, filed Apr. 20, 2017 and entitled "Devices for Controlling Computers based on Motions and Positions of Hands" can be used to implement the hand modules (117 and 119), the entire disclosures of which applications are hereby incorporated herein by reference.

FIG. 4 shows a hand module (119) and an arm module (113) as examples. An application for the tracking of the orientation of the torso (101) typically uses two arm modules (113 and 115) as illustrated in FIG. 1. The head module (111) can be used optionally to further improve the tracking of the orientation of the torso (101). Hand modules (117 and 119) can be further used to provide additional inputs and/or for the prediction/calculation of the orientations of the forearms of the user.

Typically, an IMU (e.g., 131 or 121) in a module (e.g., 113 or 111) generates acceleration data from accelerometers, angular velocity data from gyrometers/gyroscopes, and/or orientation data from magnetometers. The microcontrollers (139 and 129) perform preprocessing tasks, such as filtering the sensor data (e.g., blocking sensors that are not used in a specific application), applying calibration data (e.g., to correct the average accumulated error computed by the computing device (141)), transforming motion/position/orientation data in three axes into a quaternion, and packaging the preprocessed results into data packets (e.g., using a data compression technique) for transmitting to the host computing device (141) with a reduced bandwidth requirement and/or communication time.

Each of the microcontrollers (129, 139) may include a memory storing instructions controlling the operations of the respective microcontroller (129 or 139) to perform primary processing of the sensor data from the IMU (121, 131) and control the operations of the communication module (123, 133), and/or other components, such as the LED indicator (137), the haptic actuator (138), buttons and other input devices (125), the display device (127), etc.

The computing device (141) may include one or more microprocessors and a memory storing instructions to implement the motion processor (145). The motion processor (145) may also be implemented via hardware, such as Application-Specific Integrated Circuit (ASIC) or Field-Programmable Gate Array (FPGA).

In some instances, one of the modules (111, 113, 115, 117, and/or 119) is configured as a primary input device; and the other module is configured as a secondary input device that is connected to the computing device (141) via the primary input device. A secondary input device may use the microprocessor of its connected primary input device to perform some of the preprocessing tasks. A module that communicates directly to the computing device (141) is consider a primary input device, even when the module does not have a secondary input device that is connected to the computing device via the primary input device.

In some instances, the computing device (141) specifies the types of input data requested, and the conditions and/or frequency of the input data; and the modules (111, 113, 115, 117, and/or 119) report the requested input data under the conditions and/or according to the frequency specified by the computing device (141). Different reporting frequencies can be specified for different types of input data (e.g., accelerometer measurements, gyroscope/gyrometer measurements, magnetometer measurements, position, orientation, velocity).

In general, the computing device (141) may be a data processing system, such as a mobile phone, a desktop computer, a laptop computer, a head mount virtual reality display, a personal medial player, a tablet computer, etc.

After the initial calibration of the sensor devices (111-119) for alignment with the common coordinate system (100), the sensor devices (113-119) may move relative to the user. For example, the arm module (e.g., 115) may slip around the arm (105) of the user after a game in virtual reality or augmented reality implemented via the computing device (141). The sensor devices mounted on the arms of the user can be conveniently re-calibrated using a reference pose illustrated in FIG. 5.

Figure 5:
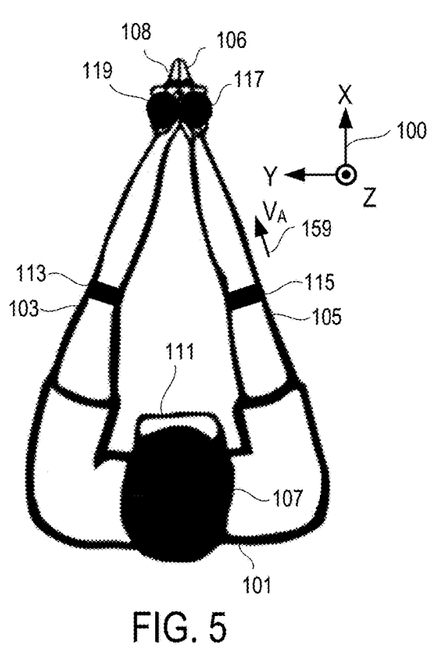
FIG. 5 illustrates a pose of a user to calibrate inertial measurement units attached to the arms of a user.

FIG. 5 illustrates a pose of a user to calibrate inertial measurement units attached to the arms of a user. For example, the calibration pose of FIG. 5 can be used for recalibration after the sensor devices (111-119) are initially calibrated according to the reference poses of FIGS. 1-3 using the computing system illustrated in FIG. 4.

In FIG. 5, the user extends arms (103 and 105) and hands (106 and 108) straight in a horizontal plane XY. The hand modules (117 and 119) are in contact with each other. The arms (103 and 105) form small angles respectively with the front facing direction X. The left and right arms (103 and 105) and the left and right hands (106 and 108) are in positions symmetric with respect to the center alone the front facing direction X. The front facing direction of the torso (101) of the user aligns with the direction X. In some instances, the calibration pose of FIG. 5 defines an updated coordinate system (100) that may have rotated along the vertical axis Z by an angle from the initial coordinate system (100) at the time of the calibration pose of FIG. 1.

The orientations of the arm modules (103 and 105) at the pose of FIG. 5 can be used to calibrate the arm modules (103 and 105) for alignment with the common coordinate system (100), as further discussed below. The calibration corrects at least the twist or turn of the arm module (e.g., 115) around the arm (105) between the time of the initial calibration (e.g., calibrated according to the reference pose of FIG. 1) and the time of recalibration using the pose of FIG. 5.

Further, the direction $V_A$ (159) of the arm (105) in the updated coordinate system (100) aligned with the front facing direction of the torso (101) at the calibration pose of FIG. 5 can be computed from the shoulder width of the user, the arm length of the user, and the width of the hand module (117) and used to calibrate the orienation of the arm module (115) within the horizontal plane XY.

FIG. 6 illustrates a skeleton model for the calibration according to the user pose of FIG. 5. For example, the skeleton model of FIG. 6 can be used to compute the direction $V_A$ (159) of the arm (105) for calibration in the horizontal plane XY.

In FIG. 6, the skeleton model has a known shoulder width $L_S$ (155), a known arm length$_S$ (153), and a known width W (151) of the handheld device (117). Thus, the distance L (157) between the handheld device (117) and the torso (101), as well as the direction $V_A$ (159) of the arm (105) relative to the updated coordinate system (100), can be computed from the shoulder width $L_S$ (155), the arm length$_S$ (153), and the width of the handheld device (117).

The skeleton model of FIG. 6 illustrates an arm (e.g., 105) as one rigid unit. Alternatively, other skeleton models may include separate forearms and upper arms that are connected via elbow joints and that may move relative to each other. Further, a skeleton model may include the head (107) and/or other portions of the user.

Figure 7:
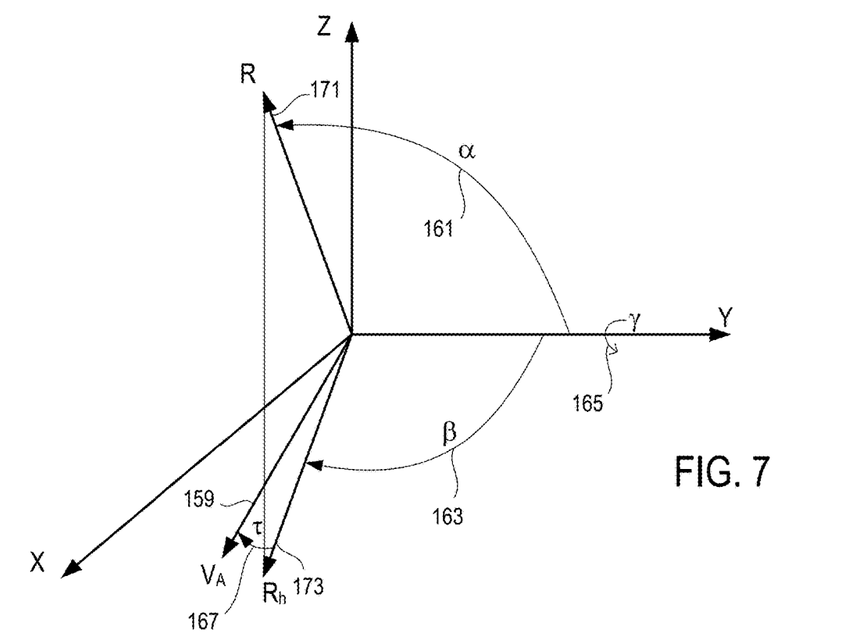
FIG. 7 illustrates the computation of rotational corrections calibrated according to the user pose of FIG. 5.

FIG. 7 illustrates the computation of rotational corrections calibrated according to the user pose of FIG. 5. For example, the computation of FIG. 7 can be performed in the computing system of FIG. 4 using the calibration pose of FIG. 5 and the skeleton model of FIG. 6, after the sensor devices (111-119) are initially calibrated for alignment with a common coordinate system (100) using the reference poses of FIGS. 1-3.

FIG. 7 illustrates a rotation γ (165) along the lengthwise direction of the arm (105) while the arm (105) is at the reference pose of FIG. 1 and a rotation τ within the horizontal plane XY along the direction Z.

The orientation change of the arm module (115) with respect to the common reference system (100) can be considered as the result of a rotation γ (165) around the arm (105) while the arm (105) is pointing along the direction Y and then a rotation β (163) within the horizontal plane XY along the direction Z.

Thus, the rotation γ (165) can be computed by removing the rotation from the orientation change of the arm module (115) with respect to the common reference system (100).

For example, the rotational transformation of the arm module (115) as measured by the arm module (115) relative to the common reference system (100) can be applied, as a rotation α (161), to a unit direction that is initially along the direction Y to obtain the lengthwise direct R (171) of the arm (105) at the time of the calibration pose of FIG. 5. The projection of the lengthwise direct R (171) at the time of the calibration pose of FIG. 5, projected onto the horizontal plane XY along the direction Z, provides a direction $R_h$ that has a rotation β (163) within the horizontal plane XY to the direction Y. The angle of the rotation β (163) can be calculated as the rotation between the direction Y and the direction $R_h$. Reversing the rotation β (163) from the rotational transformation of the arm module (115) from the reference coordinate system (100) to the calibration pose of FIG. 5, as measured by the arm module (115), provides the rotation γ (165).

When the user moves the arm (105) from the reference pose of FIG. 1 to the calibration pose of FIG. 5, the arm (105) rotates along its lengthwise direction by a predetermined angle (e.g., 39 degrees). Thus, the difference between the calculated rotation γ (165) and the predetermined angle (e.g., 39 degrees) provides a desired correction (e.g., for a result of the arm module (115) slipping around the arm (105) after the initial calibration).

After calibrating the measurement of the arm module (115) to account for the slipping of the arm module (115) around the arm (105), it may be desirable to further recalibrate to account for the rotation of the torso (101) along the vertical direction, such that the front facing direction X as calibrated is aligned with the front facing direction of the torso (101) at the time of the calibration pose of FIG. 5.

Since the arm (105) is expected to be in the direction $V_A$ (159), the rotation $\tau$ (167), rotating in the horizontal plane XY along the direction Z from the direction $R_h$ (173) to the direction $V_A$ (159), can be applied to the orientation measurement of the arm module (115) such that the measurements of the arm module (115) is calibrated according to the new front facing direction identified by the torso (101) at the time of the calibration pose of FIG. 5.

The computation of the calibration parameters (e.g., $\gamma$ (165) and $\tau$ (167)) can be performed in the computing device (141). Subsequently, the computing device (141) may apply the calibration parameters to the measurement results received from the sensor device (e.g., 115).

Alternatively, the computing device (141) may transmit the calibration parameters (e.g., $\gamma$ (165) and $\tau$ (167)) to the sensor device (e.g., 115) that calibrates subsequent measurements relative to the common coordinate system (100) as defined by the calibration pose of FIG. 5.

In some implementations, the computing device (141) transmits the parameters used for the calibration calculation to the sensor device (e.g., 115), such as the direction $V_A$ in the new coordinate system (100) aligned with the calibration pose of FIG. 5, and/or the predetermined angle of rotation (e.g., 39 degrees) along the lengthwise direction when the arm (e.g., 105) is rotated from the reference pose of FIG. 1 to the calibration pose of FIG. 5. The sensor device (e.g., 115) calculates the calibration parameters (e.g., $\gamma$ (165) and $\tau$ (167)) from its current orientation measurement upon an indication from the computing device (141) that the user is in the calibration pose of FIG. 5.

Figure 8:
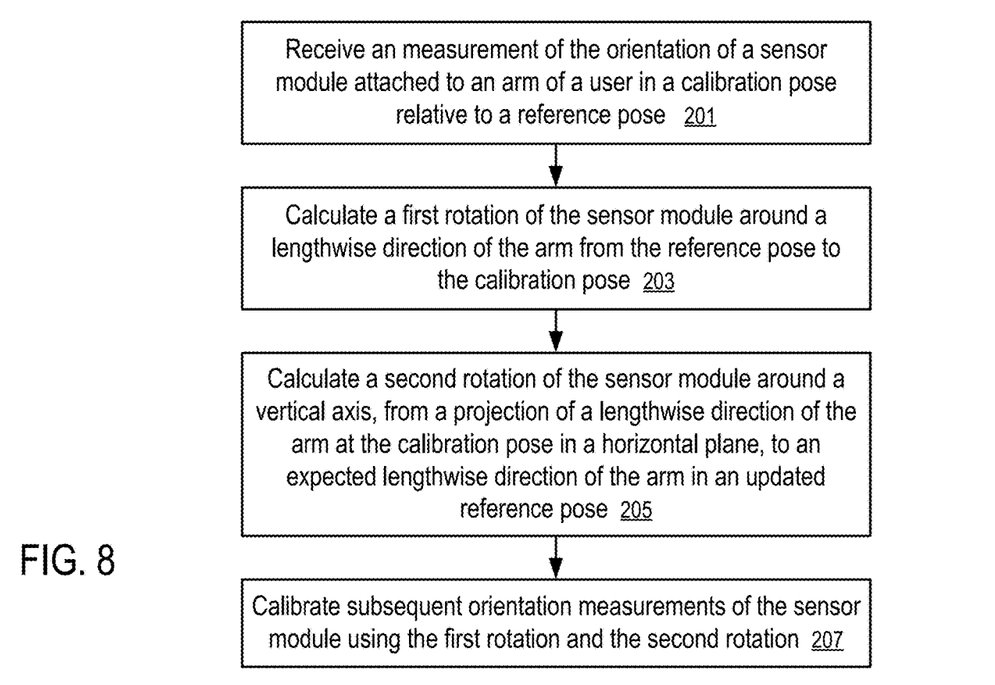
FIG. 8 shows a method to calibrate the orientation of an inertial measurement unit according to one embodiment.

FIG. 8 shows a method to calibrate the orientation of an inertial measurement unit according to one embodiment. For example, the method of FIG. 8 can be implemented in the computing system of FIG. 4 using a calibration pose of FIG. 5, the skeleton model of FIG. 6, and the rotation relations illustrated in FIG. 7, after a sensor device is calibrated using the reference poses of FIGS. 1-3.

The method of FIG. 8 includes: receiving (201) an measurement of the orientation of a sensor module (115) attached to an arm (105) of a user in a calibration pose (e.g., illustrated in FIG. 5) relative to a reference pose (e.g., illustrated in FIG. 1); calculating (203) a first rotation $\gamma$ (165) of the sensor module (115) around a lengthwise direction of the arm (105) from the reference pose (e.g., illustrated in FIG. 1) to the calibration pose (e.g., illustrated in FIG. 5); calculating (205) a second rotation $\tau$ (167) of the sensor module (115) around a vertical axis Z, from a projection $R_h$ (173) of a lengthwise direction R (171) of the arm (115) at the calibration pose (e.g., illustrated in FIG. 5), projected in a horizontal plane XY, to an expected lengthwise direction $V_A$ (159) of the arm (105) in an updated reference pose (e.g., a pose obtained by rotating the arm (105) in the horizontal plane XY to the side, in parallel with the torso (101), to be in a pose similar to that illustrated in FIG. 1, without rotating the torso (101)); and calibrating (207) subsequent orientation measurements of the sensor module (115) using the first rotation $\gamma$ (165) and the second rotation $\tau$ (167).

From the time of initial calibration with respect to the reference pose (e.g., illustrated in FIG. 1) and the time of recalibration at the calibration pose (e.g., illustrated in FIG. 5), the front facing direction of the torso (101) may have shifted by rotating along the vertical axis Z. Further, the sensor module (115) attached to the arm (105) via an armband may have slipped around the arm (105) about the lengthwise direction of the arm (105). The recalibration realigns the orientation measurement of the sensor module (115) with an updated reference coordinate system (101) that is aligned with respect to the update reference pose, without requiring the user to make the update reference pose for the recalibration. The update reference pose corresponds to the pose obtained by the user rotating the arm (105) from the calibration pose illustrated in FIG. 5 to a position where the lengthwise direction is in parallel with the torso (101) and is perpendicular to the front facing direction of the torso (101). The recalibration is performed relative to the update reference pose without requiring the user to actually make the update reference pose.

When the arm (105) rotates from the reference pose (e.g., illustrated in FIG. 1) to the calibration pose (e.g., illustrated in FIG. 5), the arm (105) rotates about its lengthwise direction by a predetermined angle (e.g., 39 degrees). The difference between the first rotation $\gamma$ (165) and the rotation of the predetermined angle (e.g., 39 degrees) represents the slip of the sensor module (115) around the arm (105) from the time of the calibration according to the reference pose (e.g., illustrated in FIG. 1) and the time of the recalibration using the calibration pose (e.g., illustrated in FIG. 5). The slip can be removed from subsequent measurements. The second rotation $\tau$ (167) can be applied to the subsequent measurements so that the subsequent measurements are calibrated according to the front facing direction of the torso (101) at the time of the calibration pose (e.g., illustrated in FIG. 5).

Figure 9:
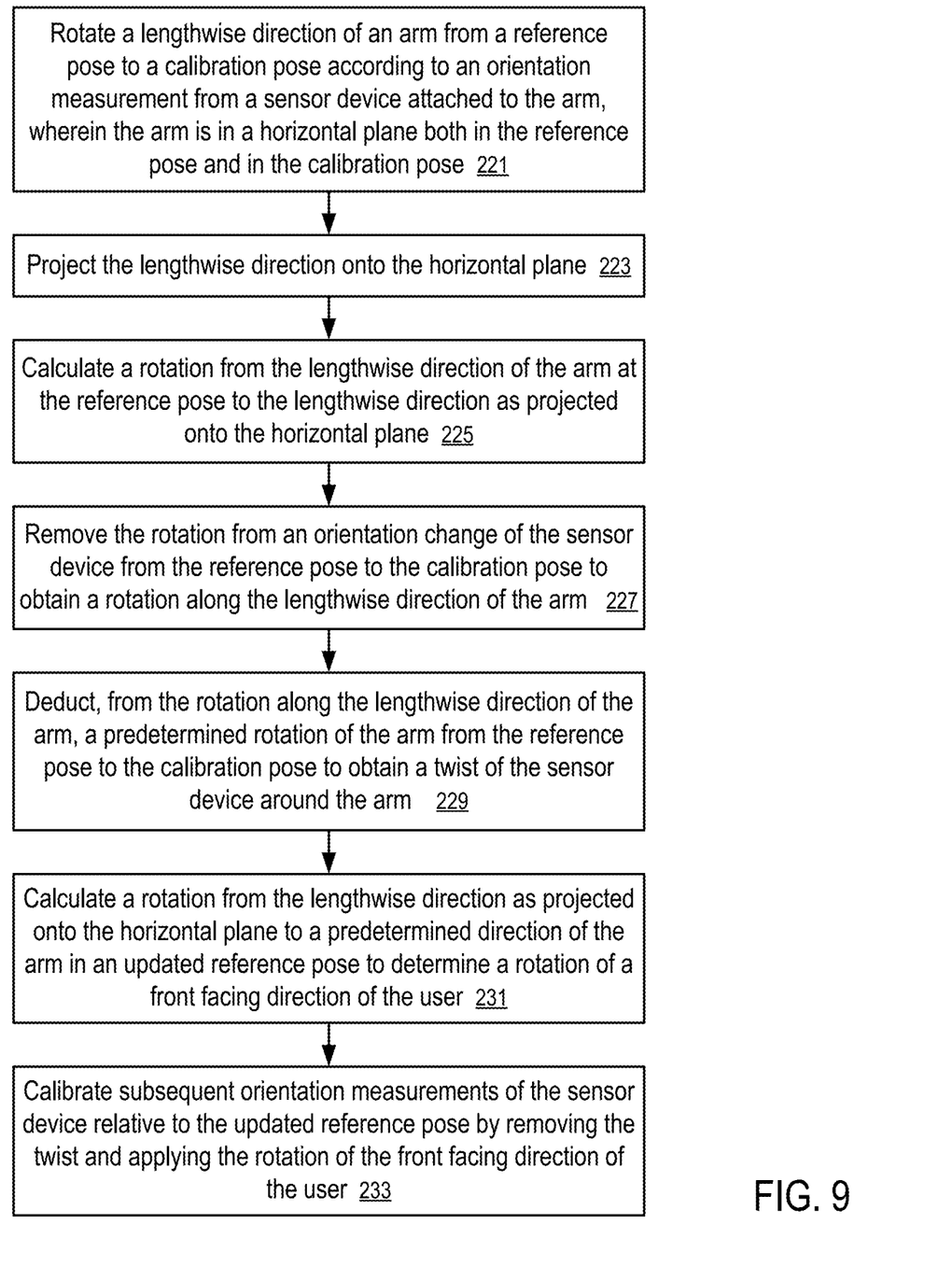
FIG. 9 shows a detailed method to perform calibration according to one embodiment.

FIG. 9 shows a detailed method to perform calibration according to one embodiment. For example, the method of FIG. 9 can be implemented in the computing system of FIG. 4 using a calibration pose of FIG. 5, the skeleton model of FIG. 6 and the rotation relations illustrated in FIG. 7, after a sensor device is calibrated using the reference poses of FIGS. 1-3.

The method of FIG. 9 includes: rotating (221) a lengthwise direction (e.g., parallel to the direction Y in FIG. 1 or 7) of an arm (105) from a reference pose (e.g., illustrated in FIG. 1) to a calibration pose (e.g., illustrated in FIG. 5) according to an orientation measurement from a sensor device (115) attached to the arm (105). The arm (105) is in a horizontal plane XY both in the reference pose (e.g., illustrated in FIG. 1) and in the calibration pose (e.g., illustrated in FIG. 5).

After the rotation $\alpha$ (161) according to the orientation measurement, the lengthwise direction of the arm (105) arrives at the direction R (171) illustrated in FIG. 7. The method of FIG. 9 further includes: projecting (223) the lengthwise direction R (171) onto the horizontal plane XY to obtain the direction $R_h$ (173) illustrated in FIG. 7; and calculating (225) a rotation $\beta$ (163), from the lengthwise direction (e.g., parallel to the direction Y in FIG. 1 or 7) of the arm (105) at the reference pose (illustrated in FIG. 1), to the lengthwise direction $R_h$ (173) as projected onto the horizontal plane XY.

The method of FIG. 9 further includes: removing (227) the rotation $\beta$ (163) from an orientation change of the sensor device (115) from the reference pose (e.g., illustrated in FIG. 1) to the calibration pose (e.g., illustrated in FIG. 5) to obtain a rotation $\gamma$ (165) along the lengthwise direction of the arm (105); and deducting (229), from the rotation $\gamma$ (165) along the lengthwise direction of the arm (105), a predetermined rotation of the arm (105) about its lengthwise direction from the reference pose (e.g., illustrated in FIG. 1) to the calibration pose (e.g., illustrated in FIG. 5) to obtain a twist of the sensor device (115) around the arm (e.g., from the time of the initial calibration according to the reference pose to the time of the calibration pose).

Optionally. the method of FIG. 9 further includes: calculating (231) a rotation $\tau$ (167), from the lengthwise direction $R_h$ (173) as projected onto the horizontal plane XY, to a predetermined direction $V_A$ (159) of the arm (105) in an updated reference pose (e.g., corresponding to the calibration pose of FIG. 5, by changing to a pose similar to the calibration pose of FIG. 1 through rotating the arms (103 and 105) without moving the torso (101)) to determine a rotation $\tau$ (167) of a front facing direction Y of the user from the time of the reference pose (illustrated in FIG. 1) to the time of the calibration pose (illustrated in FIG. 5).

The method of FIG. 9 further includes calibrating (233) subsequent orientation measurements of the sensor device (115) relative to the updated reference pose by removing the twist and optionally applying the rotation $\tau$ (167) of the front facing direction of the user.

The methods of FIGS. 8 and 9 can be implemented in the computing device (141) separate from the arm module (115), or implemented in the arm module (115). In some instances, the calibration parameters are calculated by the computing device (141) can be communicated to the arm module (115) for combination with subsequent measurements. In other implementations, a handheld device functions as a primary input device that calculates the calibration parameters and/or performs the calibration for the arm module (115) that functions as a secondary input device.

The present disclosure includes methods and apparatuses which perform these methods, including data processing systems which perform these methods, and computer readable media containing instructions which when executed on data processing systems cause the systems to perform these methods.

For example, the computing device (141), the arm modules (113, 115) and/or the head module (111) can be implemented using one or more data processing systems.

A typical data processing system may include includes an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
   a sensor module having an inertial measurement unit and attached to an arm of a user, the sensor module configured to generate a measurement of an orientation of the arm at a calibration pose relative to an initial reference pose, wherein:
      at the calibration pose, the arm is in a horizontal plane and forms a predetermined angle with respect to a front facing direction of a torso of the user at the calibration pose; and
      at the initial reference pose, the arm is in the horizontal plane and is perpendicular to a front facing direction of the torso of the user at the initial reference pose; and
   a computing device coupled to the sensor module, the computing device configured to:
      calculate, based on the measurement of the orientation of the arm at the calibration pose relative to the initial reference pose, a first rotation of the sensor module along a lengthwise direction of the arm from the initial reference pose to the calibration pose; and
      recalibrate, using the first rotation, subsequent orientation measurements of the sensor module.

2. The system of claim 1, wherein the first rotation of the sensor module relative to the arm along the lengthwise direction of the arm is calculated by:
   calculating, from the measurement of the orientation of the arm at the calibration pose relative to the initial reference pose, a second rotation, in a horizontal plane along a vertical axis, of the lengthwise direction of the arm rotating from the initial reference pose to the calibration pose; and
   identifying the first rotation by removing the second rotation from a rotation of the sensor module from the initial reference pose to the calibration pose.

3. The system of claim 2, wherein the arm rotates about the lengthwise direction of the arm from the initial reference pose to the calibration pose by a predetermined angle; and the subsequent orientation measurements of the sensor module is calibrated with a difference between the first rotation and the predetermined angle.

4. The system of claim 3, wherein the sensor module is attached to the arm via an armband; and the difference between the first rotation and the predetermined angle includes a rotation of the armband around the arm of the user between the initial reference pose and the calibration pose.

5. The system of claim 4, wherein the subsequent orientation measurements of the sensor module is calibrated to be measured relative to the initial reference pose without relative rotation between the armband and the arm of the user.

6. The system of claim 5, wherein the computing device is further configured to:
   calculate, based on the measurement of the orientation of the arm at the calibration pose relative to the initial reference pose, a third rotation in the horizontal plane along the vertical axis; and
   calibrate, using the third rotation, the subsequent orientation measurements of the sensor module relative to an updated reference pose where the arm is in the horizontal plane and is perpendicular to the front facing direction of the torso of the user at the updated reference pose.

7. The system of claim 6, wherein the third rotation is between:
   the lengthwise direction of the arm expected to be at the updated reference pose and identified by the predetermined angle in the horizontal plane relative to the updated reference pose; and
   the lengthwise direction of the arm at the calibration pose and projected in the horizontal plane according to the measurement of the orientation of the arm at the calibration pose relative to the initial reference pose.

8. The system of claim 7, wherein the predetermined angle is based on a width of a handheld device, a shoulder width of the user, and an arm length of the user.

9. The system of claim 1, wherein the sensor module includes a communication device for a communication link with the computing device.

10. The system of claim 1, wherein the inertial measurement unit includes a micro-electromechanical system (MEMS) gyroscope.

11. The system of claim 10, wherein the inertial measurement unit further includes a magnetometer and a MEMS accelerometer.

12. A method, comprising:
   generating, by a sensor module having an inertial measurement unit and attached to an arm of a user, a measurement of an orientation of the arm at a calibration pose relative to an initial reference pose, wherein:
      at the calibration pose, the arm is in a horizontal plane and forms a predetermined angle with respect to a front facing direction of a torso of the user at the calibration pose; and
      at the initial reference pose, the arm is in the horizontal plane and is perpendicular to a front facing direction of the torso of the user at the initial reference pose;

calculating, by a computing device and based on the measurement of the orientation of the arm at the calibration pose relative to the initial reference pose, a first rotation of the sensor module along a lengthwise direction of the arm from the initial reference pose to the calibration pose; and recalibrating, using the first rotation, subsequent orientation measurements of the sensor module.

13. The method of claim 12, wherein at the calibration pose, both arms of the user extends straight in the horizontal plane with hands meeting each other.

14. The method of claim 12, further comprising:

calculating, from the measurement of the orientation of the arm at the calibration pose relative to the initial reference pose, a second rotation, in a horizontal plane along a vertical axis, of the lengthwise direction of the arm rotating from the initial reference pose to the calibration pose;

wherein the first rotation is calculated by removing the second rotation from an orientation change of the sensor module from the initial reference pose to the calibration pose.

15. The method of claim 14, further comprising:

computing a difference between first rotation and the predetermined angle of rotation of the arm from the initial reference pose to the calibration pose;

wherein the subsequent orientation measurements of the sensor module is calibrated using the difference.

16. The method of claim 15, wherein the sensor module is attached to the arm via an armband; and the difference between the first rotation and the predetermined angle identifies a rotation of the armband around the arm of the user between the initial reference pose and the calibration pose.

17. The method of claim 16, wherein the subsequent orientation measurements of the sensor module is calibrated by removing the difference caused by the rotation of the armband around the arm of the user.

18. The method of claim 17, further comprising:

calculating, based on the measurement of the orientation of the arm at the calibration pose relative to the initial reference pose, a third rotation in the horizontal plane along the vertical axis; and calibrating, using the third rotation, the subsequent orientation measurements of the sensor module relative to an updated reference pose where the arm is in the horizontal plane and is perpendicular to the front facing direction of the torso of the user at the updated reference pose.

19. The method of claim 18, wherein the third rotation is calculated as a rotation of between:

the lengthwise direction of the arm expected to be at the updated reference pose and identified by the predetermined angle in the horizontal plane relative to the updated reference pose; and the lengthwise direction of the arm at the calibration pose and projected in the horizontal plane according to the measurement of the orientation of the arm at the calibration pose relative to the initial reference pose.

20. A non-transitory computer storage medium storing instructions which, when executed by a computing device, instructs the computing device to perform a method, the method comprising:

receiving, from a sensor module having an inertial measurement unit and attached to an arm of a user, a measurement of an orientation of the arm at a calibration pose relative to an initial reference pose, wherein:

at the calibration pose, the arm is in a horizontal plane and forms a predetermined angle with respect to a front facing direction of a torso of the user at the calibration pose; and at the initial reference pose, the arm is in the horizontal plane and is perpendicular to a front facing direction of the torso of the user at the initial reference pose;

calculating, by a computing device and based on the measurement of the orientation of the arm at the calibration pose relative to the initial reference pose, a first rotation of the sensor module along a lengthwise direction of the arm from the initial reference pose to the calibration pose; and recalibrating, using the first rotation, subsequent orientation measurements of the sensor module.

* * * * *